United States Patent [19]

Allain

[11] Patent Number: 4,941,233
[45] Date of Patent: Jul. 17, 1990

[54] METHOD AND APPARATUS FOR PROCESSING SHRIMP

[75] Inventor: Reid P. Allain, Marietta, Ga.

[73] Assignee: Robert B. Kennedy, Atlanta, Ga.

[21] Appl. No.: 288,425

[22] Filed: Dec. 22, 1988

[51] Int. Cl.[5] .............................................. A22C 29/00
[52] U.S. Cl. ............................................. 17/71; 17/73; 17/24
[58] Field of Search ................... 17/74, 71, 72, 54, 48, 17/73, 24

[56] References Cited

U.S. PATENT DOCUMENTS

| | | | |
|---|---|---|---|
| 2,781,544 | 2/1957 | Skrmetta | 17/2 |
| 2,818,598 | 1/1958 | Skrmetta | 17/74 |
| 2,958,896 | 10/1960 | Merrick | 17/71 |
| 2,976,564 | 3/1961 | Skrmetta | 17/73 |
| 3,024,490 | 3/1962 | Skrmetta | 17/65 |
| 3,031,714 | 5/1962 | Skrmetta | 17/2 |
| 3,070,833 | 1/1963 | Skrmetta | 17/45 |
| 3,383,734 | 5/1968 | Lapeyre | 17/73 |
| 3,414,934 | 12/1968 | Skrmetta et al. | 17/72 |
| 3,696,466 | 10/1972 | Letchworth | 17/71 |
| 3,784,007 | 1/1974 | Skrmetta | 209/858 |
| 3,816,877 | 6/1974 | Bullock | 17/73 |
| 3,897,610 | 8/1975 | Lapeyre | 17/71 |
| 4,016,625 | 4/1977 | Mitchell | 17/71 |
| 4,692,965 | 9/1987 | Stephenson | 17/48 |

FOREIGN PATENT DOCUMENTS 3535035 4/1986 Fed. Rep. of Germany .......... 17/71

*Primary Examiner*—Willis Little
*Attorney, Agent, or Firm*—Thomas & Kennedy

[57] ABSTRACT

Shrimp are conveyed in upright orientation upon a pair of spaced rails that revolve in upright planes and which strike bumpers. The shrimp may be size sorted by orienting the rails such that their spacing changes. The shrimp are deheaded by conveying then to a deheader that has a pinch finger that swings by a pinch block.

27 Claims, 5 Drawing Sheets

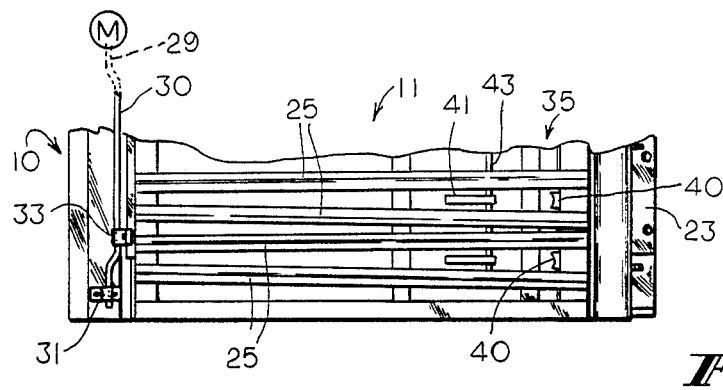
Fig 2
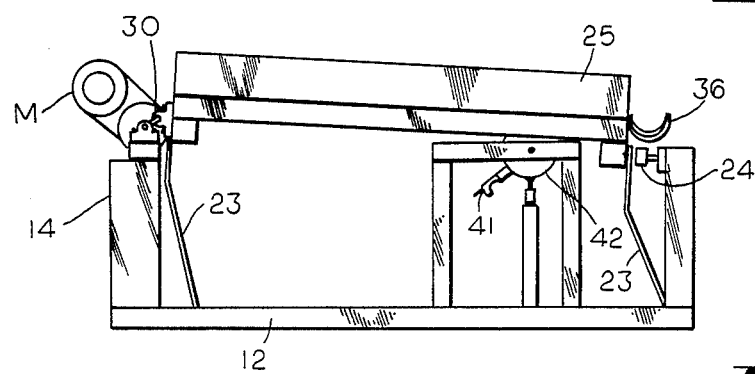
Fig 3
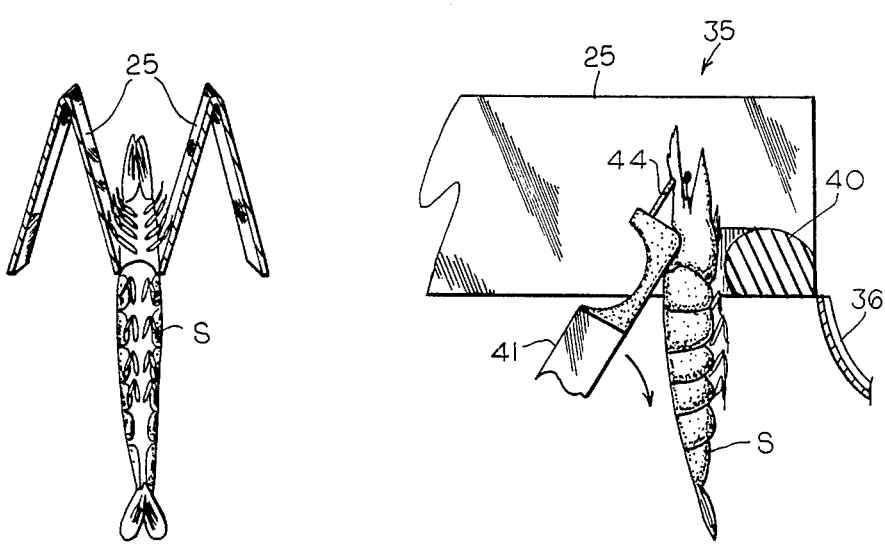
Fig 4
Fig 5

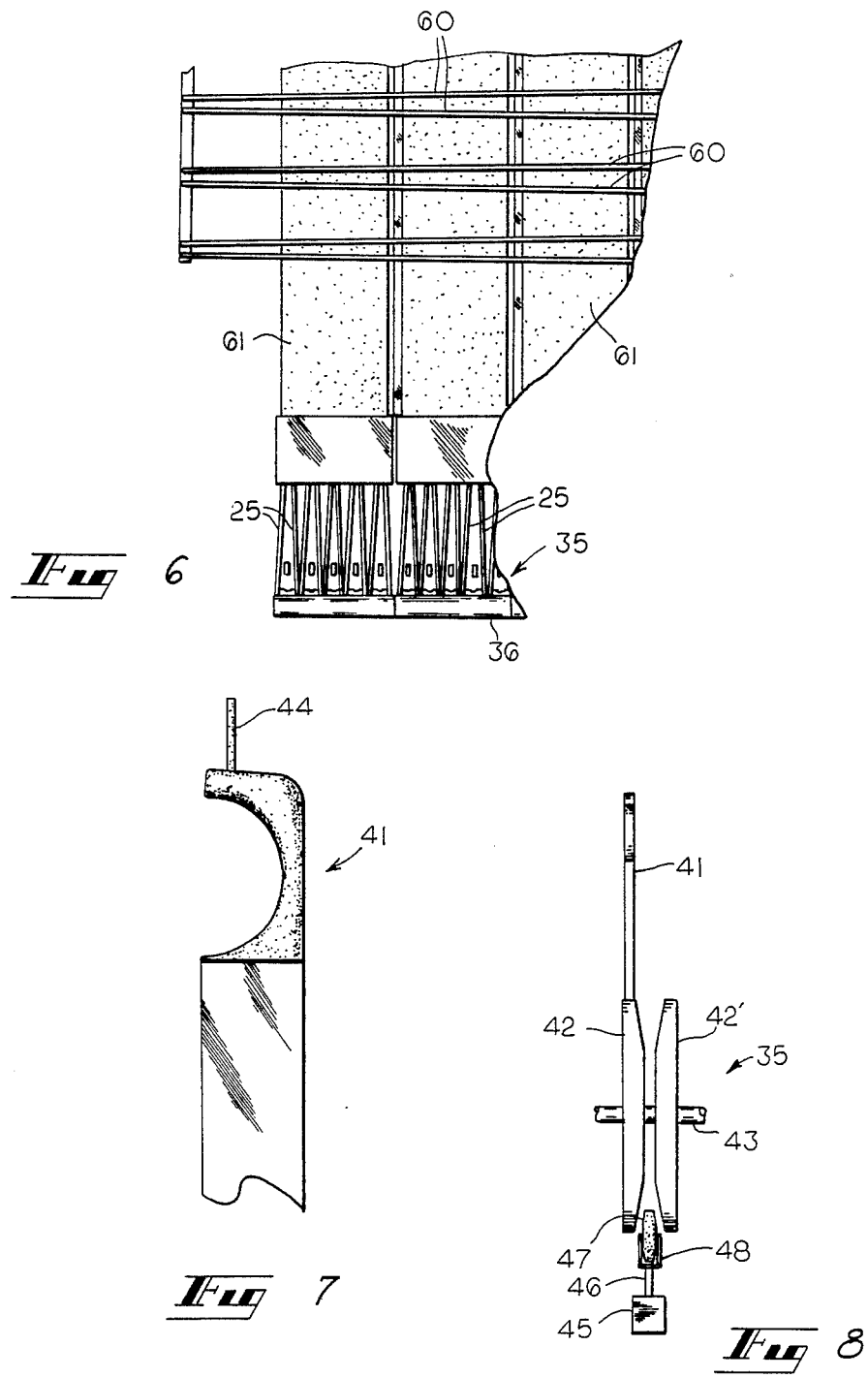

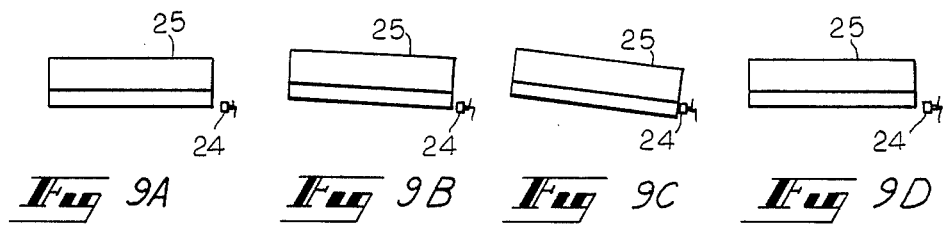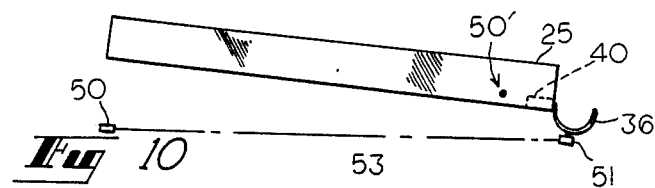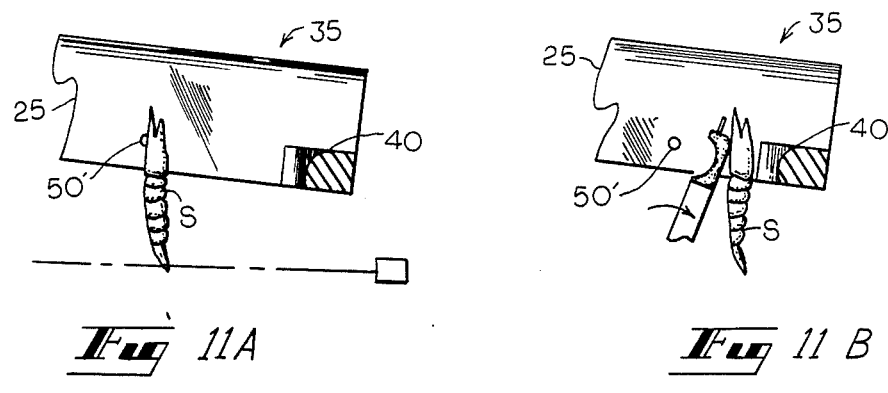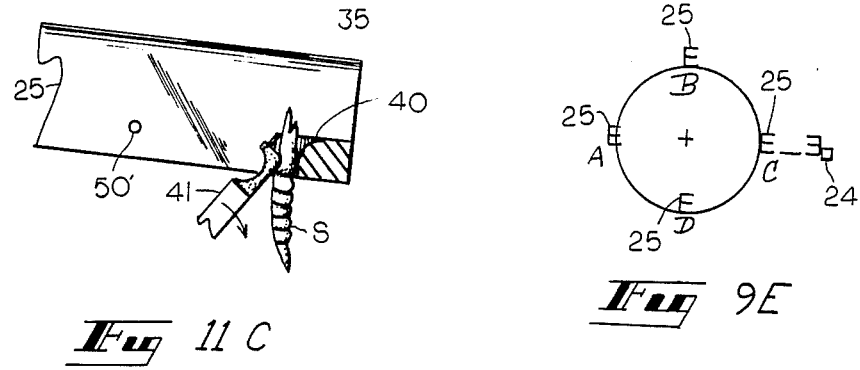

METHOD AND APPARATUS FOR PROCESSING SHRIMP

TECHNICAL FIELD

This invention relates generally to methods and apparatuses for processing crustaceans, and particularly to methods and apparatuses for conveying, sorting and deheading shrimp on an automated basis.

BACKGROUND OF THE INVENTION

Heretofore crustaceans have been conveyed from one location to another on common conveyor belts, in vibrating troughs, and through conduits and the like. However, when shrimp are conveyed in this manner they arrive at their destination in random orientations. Thus, these forms of conveyances are ineffective for use in sorting and deheading shrimp which must be properly presented and oriented to processing devices such as sorters, deheaders, deveiners, and the like.

Specially designed mechanisms such as push bars and pawls have been associated with conveyors in an attempt to orient shrimp properly for processing. These however have proven to be unreliable and have enjoyed no significant commercial success. Exemplary of such prior art attempts at automating shrimp processing are those machine and methods disclosed in U.S. Pat. Nos. 3,696,466, 3,784,007, 3,897,610, 4,016,625, and 4,692,965.

Accordingly, it is seen that a need has long existed for methods and apparatuses for processing shrimp on an automated basis, and particularly to methods and apparatuses for conveying, sorting and deheading in a commercially efficient and effective manner. It is to the provision of such methods and apparatuses therefore that the present invention is primarily directed.

SUMMARY OF THE INVENTION

It has now been discovered that shrimp may be conveyed in single file formation and in upright orientations by depositing them in an elongated gap supported upon two gap-defining rails which are revolved in an upright plane oriented along the rails. This movement of the rails has been found to cause the shrimp to advance along the rails even with the rails oriented along inclines or declines. Moreover, the shrimp are conveyed in upright orientations so that they may be properly presented to processing devices such as deheaders. Preferably, the rails contact bumpers as they revolve. The shrimp may be size sorted by merely mounting the rails so that the gap between them widens in the direction of shrimp advance. The deheader is of a pinch type which comprises a pinch block mounted between the rails and a pinch finger that is driven along a path of travel passing closely adjacent to the pinch block.

BRIEF DESCRIPTION OF THE DRAWING

FIG. 2 is a top view of a portion of the apparatus illustrated in FIG. 1.

FIG. 3 is a side elevational view of the apparatus illustrated in FIG. 1.

FIG. 4 illustrates a shrimp being conveyed uprightly along a pair of rails members of the apparatus illustrated in FIG. 1.

FIG. 5 is a side elevation view showing a single shrimp positioned at a deheading station of the apparatus illustrated in FIG. 1 in the process of being deheaded.

FIG. 6 is a plan view of sorting and conveying equipment shown positioned adjacent a portion of the apparatus of FIG. 1 which may be used in conveying shrimp thereto.

FIG. 7 is an enlarged side elevational view of a portion of the deheader pinch finger shown in FIG. 5.

FIG. 8 is an end elevational view of the deheading station which illustrates the pinch finger shown in FIG. 7 together with means for driving it.

FIGS. 9A-9D and 9E schematically illustrate the orientation of rail members of the apparatus during stages of their revolution.

FIG. 10 schematically illustrates a shrimp position detector portion of the apparatus illustrated in FIG. 1.

FIGS. 11A-11C illustrate a sequence of events that occurs during a deheading operation.

DETAILED DESCRIPTION

Figure 1:
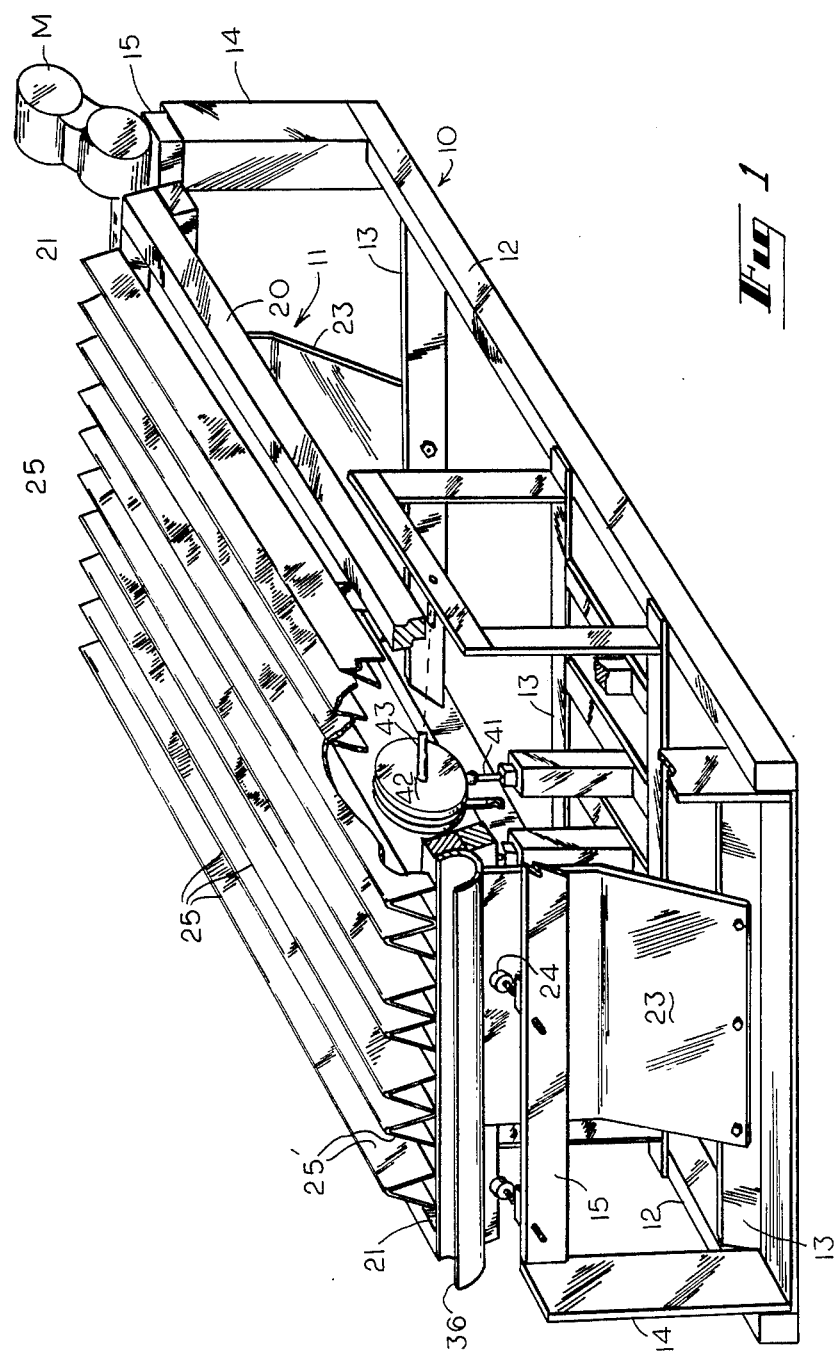
FIG. 1 is a perspective view of shrimp processing apparatus that embodies principles of the invention in a preferred form and which may be used in practicing method of the invention.
Figure 12:
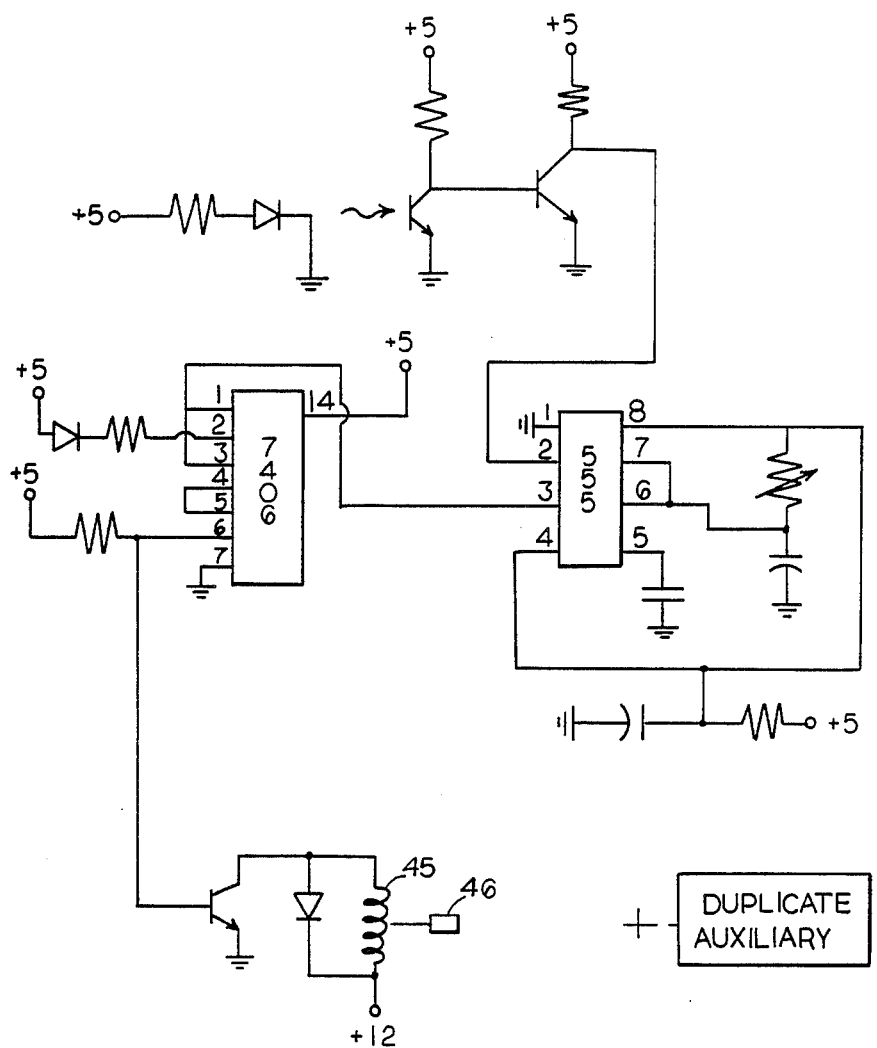
FIG. 12 is a schematic diagram of the electronic circuit used in controlling the apparatus illustrated in FIG. 1.

With reference next to the drawing, there is shown in FIG. 1 apparatus for processing shrimp which comprises a base frame, indicated generally at 10, upon which a carriage, indicated generally at 11, is movably supported. The frame 10 comprises a pair of elongated side beams 12 to which lower cross beams 13 are mounted at opposite ends. The frame also includes upright members 14 to which upper cross beams 15 are mounted.

The carriage 11 has a carriage frame comprised of elongated side beams 20 to the ends of which cross beams 21 are mounted. The carriage is movably supported upon the frame 10 by means of a pair of flexible hinge plates or flex plates 23 which are secured at their bottom ends to the cross beams 13 and at their top ends to the cross beams 21 of the carriage Since the hinge plates flexibly move, they may be characterized as being part of the carriage or the carriage support. Resilient bumpers 24 are mounted to one of the base frame cross beams 15 for contact with one of the hinge plates 23 during movement of the carriage. Thus, bumping contact with the hinge plate against the bumpers 24 is deemed to constitute operative contact with the other members of the carriage.

With continued reference to FIG. 1, the carriage is seen further to include five pairs of inverted V-shaped rails that extend lengthwise in side by side relation. One specific pair of rails is identified in FIG. 1 at 25'. The rails are spaced apart to provide an elongated gap therebetween. Each pair of rails has two substantially flat surfaces that face each other and which provide an elongated gap therebetween. Each pair also has two non-operational flat surfaces that face away from each other. Alternatively, the rails may be assembled so that opposite faces of individual inverted V-shaped rails are both used in defining a side of two adjacent gaps. Note that the rails are not exactly parallel so that the elongated gap between them widens in one direction.

Means are also provided for moving the carriage 11 and the rails 25 upon the stationary frame 10 which includes an electric motor M mounted to a cross beam 15 of the frame 10 adjacent one end of the carriage. As best shown in FIGS. 2 and 3, the output shaft 29 of the motor M is coupled with a crankshaft 30 that is offset from the axis of rotation of the motor drive shaft 29. The end of the crankshaft 30 located distally from the motor M is journaled through a pillow block bearing 31 which is mounted axially aligned with the axis of the motor output shaft 29. The crankshaft 30 is itself journaled through bracket-type bearings 33 which are mounted to a carriage cross beam. Thus it is seen that operation of the motor causes the crankshaft 30 to revolve about the axis of the motor power output shaft 29. This causes each pair of rails 25 to revolve in an upright plane with the hinge plate 23 that supports this end flexing accordingly. Since one end of the rail pairs are not driven, but merely rock upon a hinge plate, the movement of that end is merely reciprocal rather than revolutionary.

The motor output shaft 29 is driven in a clockwise rotary direction as viewed in FIG. 3 at a preferred speed of between 3800 and 4800 RPM and with the circular orbit of the crankshaft preferably being between 30 and 70 mils diameters. Alternatively, both ends of the carriage and rails may be motor driven as just described whereupon the entire length of the rails follow a revolutionary orbit. As another alternative the motor M may be mounted at the opposite ends of the rails.

With continued reference to the drawing the apparatus is seen to include 5 identical means for deheading shrimp conveyed on each of the five pairs of rails. These means are located at shrimp deheading stations, one of which is indicated generally at 35 in FIGS. 5 and 8 adjacent to a shrimp collection trough 36 that extends by all five of the deheading means. This trough is mounted to the end of the carriage located adjacent the hinge plate 23 that engages the bumpers 24. Each deheader includes a pinch block or stop 40 which is mounted between a pair of rails 25 adjacent to an upper lip of the trough 36. If desired, the pinch block may form an extension of the trough lip. The deheader mechanism also includes a pinch finger 41, having a resilient flipper 44 mounted to its end. The finger is mounted to a fly wheel 42 which itself is mounted loosely upon an axle or shaft 43 that extends across the carriage as shown in FIG. 1. The axle 43 is rotatably supported on the frame 10 and is driven by an electric motor which that is hidden from view in FIG. 1. The axial position of the fly wheel 42 along shaft 43 is maintained by conventional collars or keys.

The wheel 42 may be clutched into and out of operative engagement with the drive shaft 43 so as to be driven in unison therewith by means of the clutch mechanism shown in FIG. 8. This mechanism includes another fly wheel 42' which is permanently mounted to the shaft 43 spaced slightly from the wheel 42 to which the pinch finger 41 is secured. Clutching is achieved by actuation of a solenoid indicated generally at 45 in FIG. 8. The solenoid repositions a plunger 46 to which a friction wheel 47 is mounted for free rotation in a fork 48. Therefore, upon actuation of the solenoid the friction wheel 47 is moved into engagement with confronting beveled surfaces of the two wheels 42 and 42' whereupon the fly wheel 42, to which the pinch finger is rigidly mounted, is held to the fly wheel 42' and is thereby driven by it until declutched by solenoid deactivation. When the fly wheel 42 is clutched into engagement with the wheel 42', the pinch finger 41 is driven from a position located downwardly in breaking and holding contact with a rubber pad mounted upon a side of the housing of the relay 45 until the solenoid is deactivated. Once this occurs the pinch finger becomes again gripped by the pad oriented downwardly.

Operation of the deheader by the solenoid 45 is initiated by the detection of a shrimp as being located in close approach to or in actual contact with the pinch block 40. Detection is provided by means of a conventional photoelectric detector system as schematically shown in FIG. 10. Here the photoelectric system is seen to include an infrared light source 50 mounted beneath one end of each pair of rails 25 and an infrared light detector 51 mounted beneath the trough 36 so as to provide a beam of light 53 that is oriented at a slight angle with respect to the bottom of the rails 25. Another such system may be provided as indicated at 50' to cast a beam transversely to the rails. As a shrimp moves along the rails in close approach to the deheading station 35, it moves into a position blocking the beam 53. This is shown first occurring in FIG. 11A. This detection actuates an electronic control circuit, as hereinafter described, which actuates the solenoid 45, after a short time delay, which causes the pinch finger 41 to swing. The provision of the second photoelectric sensor system 50' may provide a backup to the system 50/51 or be used where no time delay is desired.

The electronic control system conventionally comprises a 555 IC timer to effect a time delay and a 7406 IC driver. The signal output line from the detector 51 is connected to the base of a transistor T1 which has its collector connected to a 5 VDC power source through a resistor R3. Its collector is also connected to pin 2 of the timer which has its pin 1 directly grounded and its pin 5 grounded through a capacitor C1. Pins 4 and 8 of the timer are connected to ground through another capacitor C2 and to a power source through a resistor R4. The timer, which here is operated in a monostable mode, is set by means of an adjustable resistor R5 that is connected across pins 6 and 7 and to ground through an electrolytic capacitor C3.

The 7406 driver has its pins 1 and 3 connected to pin 3 of the timer. A circuit check LED 59 is connected to pin 2. Where the auxiliary detector 50' is used its output signal may be inputted directly to pins 1 and 3 of the driver. Pin 6 of the driver is connected to the base of a transistor T2 to switch on the solenoid 45 across which a diode 52 is connected. This action moves the plunger 46 thereby clutching the pinch finger 41 into driving engagement with the shaft 43. A set of operative values for the circuit components is as follows:

| | |
|---|---|
| R1 | 150 ohms |
| R2 | 4.7K ohms |
| R3 | 4.7K ohms |
| R4 | 56K ohms |
| R5 | 1 M ohms |
| R6 | 300 ohms |
| R7 | 4.7K ohms |
| C1 | 0.01 uF |
| C2 | 47 uF |
| C3 | 10 uF |
| T1 | 2 N 222 |
| T2 | 2 N 222 |

In operation, when the beam 53 is broken by a shrimp approaching the deheading station, the photo detector 51 turns on and drives the transistor T1 on thereby grounding pin 2 of the timer. When pin 2 is grounded pin 3 goes high which drives pins 2 and 4 of the driver low at a delay established by the setting of the variable resistor R5. The circuit check light emitting diode 59 is activated which may be used as a counter. Pin 4 going low drives pin 6 high which switches on transistor T2. This energizes the solenoid 45 which clutches the deheader wheel 42. When the shrimp is deheaded its body falls down from the rails whereupon continuity of the beam 53 is reestablished which deactuates the circuit until the next successive shrimp breaks the beam.

With reference to FIG. 6 it is seen that the apparatus just described may be ganged together with others and used for deheading shrimp of different size categories. Multiple uses of the invention are made here. When the pairs of rails 60 are driven in the same revolutional manner as previously described, shrimp deposited on them advance along the rails over a series of conveyor belts 61 which move along an endless path of travel beneath the rails. Since the rails become spaced wider as they extend from left to right in this figure, shrimp of smaller size tend to fall upon the left conveyor belts while shrimp of larger size fall on others of the conveyor belts. From here the shrimp are delivered by the belts onto the rails 25 of ganged apparatuses of the type shown in FIG. 1 whose longitudinal gaps differ slightly in widths to accommodate the differences in shrimp sizes. Thus, each set of five pairs of rails handle shrimp of a particular size range for both increased reliability of operation as well as for sorting purposes.

With reference next to FIGS. 9A-9D and 9E the movement of the rails may be best visualized during one cycle of operation. In each of the figures here the left end of the rails is that which is coupled with the motor M while the opposite end is the one located adjacent a bumper 24 and the deheading station. The left end of the rails thus are being revolved in the plane of the paper upon which these figures are drawn so that at least this end of the rail revolves in a circular orbit about a generally horizontal axis. This revolutionary movement tapers to approximately linear reciprocal movement at the other end that merely is supported upon a flex plate. The positions shown in FIGS. 9A-D correspond to the positions of the rails indicated in FIG. 9E where the lower left corner 25 of the rails is shown in each of four positions A-D. Thus in FIG. 9A the lower left end corner of the rails is shown to be located in its extreme left position at neutral elevations.

As the crankshaft 30 of the motor M moves upwardly (as viewed in FIG. 3) and to the right, the rails are both lifted and moved toward the right and toward the bumper 25 until they reach the position illustrated in FIG. 9B, which corresponds with its location B shown in FIG. 9E. Continued movement of the crankshaft causes the rails to move further to the right with a descending motion until the rails contact the bumper 24 as shown in FIG. 9C and location C in FIG. 9E. This is just before the rails have reached their furthermost position to the right. From here the rails descend to their lowermost position D in FIG. 9D and away from the bumpers and finally back to position A.

It appears that when the rails upon which the shrimp are slidably supported are driven at a suitable speed and with suitable longitudinal translation or stroke length provided by the crankshaft, or by a cam or similar mechanism, their revolutionary path of travel generates a net momentum in the shrimp such as to propel them in one direction along the rails. Should this revolutionary motion be conducted at too low a speed the shrimp merely rise and fall without advancement made upon the rails. Conversely, too high a speed can prove to be disruptive. Merely vibrating the shrimp has never been found to be effective since their physical make-up enables them to absorb the vibrations. A speed of 3800 to 4800 RPM has been found to work well in conjunction with a lateral displacement, i.e. crankshaft orbit diameter, of 30 to 70 mils. This revolutionary motion of the shrimp supports, in combination with the forces of gravity, causes the shrimp to advance in one direction.

With reference again to FIG. 9E it may be seen as the rails move from the position A to the position B both vertical and left to right vectoral components of force are imparted to them. This causes the shrimp to be lifted and moved to the right. From the position B to the position C the rails supports still move to the right but also descend. This in effect causes the shrimp to be propelled to the right with less weight imparted by them upon the rails which are in the process of dropping out from under them. Thus their momentum here causes the shrimp to move to the right in a sliding or in a combined airborne/sliding mode of travel with respect to the rail supports. This apparently continues even as the rails move from position C to position D because at least early in this portion of the cycle the shrimp exert very little weight upon and frictional engagement with the rails. Therefore, by the time the shrimp reassert their full weight upon the rails, the rails are once again cycling upwardly causing the shrimp to be lifted from position D to A. Thus even though the vectoral components of motion and acceleration balance out during a complete cycle, the associated gravational forces combine with the revolutional movement of the rails to cause net displacement of the shrimp to the right.

Where the just described revolutionary movement is combined with the abrupt forces generated by contacts of the rails with the bumpers at a position 9C, the rails abruptly deaccelerate here. Where rail movements to the right in FIG. 9 is deemed as being their outstrokes, and their movements to the left as being their backstrokes, their contact with the bumpers cause them to deaccelerate more at the end of their outstrokes than at the end of their backstrokes. This action has been found to enhance the propulsion that the shrimp experience when supported upon the revolving rails. Thus with the provision of the bumpers a good advance rate may be achieved at lower RPM speeds. This just described method of conveying the shrimp is found to work with rails oriented generally horizontally as well as on a decline in the direction of shrimp conveyance and even with the rails oriented at significant degrees of incline.

With the shrimp deposited onto one end of the rails they are initially at various orientations. Quickly however they assume a generally upright orientation with their tails depending out from the bottom of the elongated gap between the rails. As the gap widens the shrimp ride in a position nested somewhat lower on the rails until they are in a position as shown in FIG. 4 preparatory for deheading. Preferably, for minimization in meat attachment to head after severence, their rotary position (almost a vertical axis) is as shown with their feelers adjacent the block. Thus, the shrimp are not only individually conveyed in single line formation they are also conveyed in a predictably upright orientation for processing.

Once the shrimp reach a position in close proximity with the pinch block, the pinch finger is actuated whereupon it swings, as shown in FIG. 5, into contact with the head of the shrimp adjacent its juncture with the first body section. With the head urged firmly against the pinch block the finger moves just past the block, e.g. with a 2 mils spacing at the closest approach. At this point the body is severed and falls. The resilient flipper 44 on the top of the finger flips the severed head over the top of the pinch block and into the collection trough.

It thus is seen that a method and apparatus is provided for processing shrimp on an automated bases which has never before been made commercially possible. It should, of course, be understood that the just described embodiment merely illustrate principles of the invention in a preferred form. Many modifications, additions and deletions may be made thereto without departure from the spirit and scope of the invention as set forth in the following claims.

I claim:

1. Apparatus for conveying shrimp in single file formation for processing and which comprising elongated support means for slidably supporting shrimp in generally upright orientations with the shrimp heads slidably supported above the shrimp tails and which comprises a pair of rails rigidly mounted together side by side spaced apart a distance to support shrimp generally uprightly in an elongated gap therebetween, means for revolving at least a portion of said elongated support means in a generally vertical plane, and means for deheading shrimp at a deheading station located along said rails that comprises a pinch block rigidly mounted between said rails and a pinch finger mounted for rotary movement along a path of travel that passes closely adjacent to said pinch block about an axis located to one side of said pinch block.

2. Apparatus for conveying shrimp in single file formation for processing and which comprises elongated support means for slidably supporting shrimp in generally upright orientations, means in a generally vertical plane, and a bumper mounted for engagement with said support means as said support means moves downwardly during its revolutionary movement in said generally vertical plane.

3. Apparatus for conveying shrimp for processing comprising a pair of rails rigidly mounted together side by side and spaced apart a distance to support shrimp generally uprightly in an elongated gap therebetween, means for revolving at least a portion of said rails in an upright plane, and means for deheading shrimp at a deheading station located along said rails and which includes a pinch block mounted between said rails and a pinch finger mounted for movement along an accurate path of travel between said rails closely adjacent to and to one side of said pinch block.

4. Apparatus for conveying shrimp for processing comprising a pair of rails rigidly mounted together side by side and spaced apart a distance to support shrimp generally uprightly in an elongated gap therebetween, means for revolving at least a portion of said rails in an upright plane, and a bumper mounted for contact by said rails during a descending portion of rails revolving motion in said upright plane.

5. A method of conveying shrimp in single file formation for processing which comprises the steps of depositing the shrimp upon an elongated support bounded by two rail members of the support that are spaced apart a distance to support the shrimp generally upright upon the rails, and revolving at least a portion of the support in a generally upright plane oriented generally along the elongated support at a speed of between 3800 and 4800 RPM.

6. The method of claim 5 wherein the support portion is revolved in a circular orbit of between 30 and 70 mils diameter.

7. A method of conveying shrimp in single file formation for processing which comprises the steps of depositing the shrimp upon an elongated support and revolving at least a portion of the support in a generally upright plane oriented generally along the elongated support against a bumper on each revolution.

8. A method of deheading shrimp comprising the steps of depositing the shrimp in an elongated gap supported upon a pair of rails that border the gap and between which a pinch block is mounted, revolving the pair of rails in a generally upright plane oriented generally along the elongated gap thereby causing the shrimp to advance in upright orientations towards the pinch block, sensing the presence of a shrimp located closely adjacent to or in contact with the pinch block, and in response to the sensed presence of a shrimp severing the head of the shrimp by moving a pinch finger into contact with the shrimp and closely past the pinch block.

9. The method of claim 8 wherein the rails are revolved into contact with a bumper on each revolution.

10. The method of claim 8 wherein at least a portion of the rails are revolved at a speed of between 3800 and 4800 RPM.

11. The method of claim 9 wherein at least a portion of the rails are revolved in a circular orbit of between 30 and 70 mils diameter.

12. The method of sorting shrimp according to size comprising the steps of depositing the shrimp in an elongated gap that varies in gap size supported upon a pair of rails that border the gap, and revolving the pair of rails in a generally upright plane oriented generally along the elongated gap into contact with a bumper on each revolution whereby the shrimp advance along the rails and fall at those locations where the gap is too large for the rails to support shrimp of a given size and thereby become sorted according to size.

13. The method of sorting shrimp according to size comprising the steps of depositing the shrimp in an elongated gap that varies in gap size supported upon a pair of rails that border the gap, and revolving the pair of rails in a generally upright plane oriented generally along the elongated gap with at least a portion of the rails being revolved at a speed of between 3800 and 4800 RMP whereby the shrimp advance along the rails and fall at those locations where the gap is too large for the rails to support shrimp of a given size and thereby become sorted according to size.

14. The method of claim 13 wherein at least a portion of the rails are revolved in a circular orbit of between 30 and 70 mils diameter.

15. A method of deheading shrimp comprising the steps of supporting the shrimp in a generally upright position in an elongated gap defined by a pair of rails with the shrimp slidably supported on the rails, moving the rails so as to be reciprocally moved with outstrokes and backstrokes with the rails being deaccelerated more at the end of their outstrokes than at the end of their backstrokes by being moved into contact with a bumper at the end of their outstrokes, and severing the heads of the shrimp as they are positioned uprightly against the stop.

16. A method of deheading shrimp comprising the steps of supporting the shrimp in a generally upright position in an elongated gap defined by a pair of rails with the shrimp slidably supported on the rails, moving the rails so as to cause the shrimp to slide upon the rails into contact with a stop, and pinching off the heads of the shrimp as they are positioned uprightly against the stop by moving a pinch finger into pinching engagement with shrimp positioned uprightly in contact with the stop by moving the pinch finger in a circular arc into pinching engagement with the shrimp.

17. A method of conveying shrimp in single file formation for processing which comprises the steps of depositing the shrimp in an elongated gap between two juxtaposed rail members of a carriage with the shrimp slidably supported upon the rails in a generally upright orientation, and reciprocating the carriage with alternating outstroke and backstroke movements with greater deceleration at the ends of the outstrokes than at the ends of the backstrokes by driving the carriage into contact with a bumper at the end of the outstrokes whereby the shrimp are conveyed upon the rails in the outstroke direction.

18. A method of conveying shrimp in single file formation for processing which comprises the steps of positioning the shrimp uprightly within a gap defined by a pair of juxtaposed rails with the shrimp slidably supported upon the rails, and driving the rails back and forth into and out of contact with a bumper.

19. A method of sorting shrimp according to size which comprises the steps of positioning the shrimp uprightly within an elongated gap defined by a pair of juxtaposed rails that widens in one direction with the shrimp slidably supported upon the rails, and moving the rails back and forth in the general direction of the elongated gap with greater rail decelerations being made at the end of rail movements in the one direction than at the end of rail movements in the opposite direction by moving the rails back and forth into and out of contact with a bumper, whereby the momentum generated in the shrimp causes them to slidably advance in the one direction and to fall from the rails as the rails widen sufficiently to permit the shrimp to fall therefrom.

20. Apparatus for conveying shrimp in single file upright formation for processing, and with the apparatus comprising a frame and a carriage movably mounted upon said frame, a pair of rails rigidly mounted together side by side upon said carriage spaced apart a distance to support shrimp generally uprightly in an elongated gap therebetween, and means for reciprocating said pair of rails with alternating outstroke and backstroke movements and with greater deacceleration at the ends of the outstrokes than at the end of the backstrokes whereby shrimp supported on the rails are conveyed on the rails in the direction of the rails outstrokes, said reciprocating means including a bumper mounted to said frame for contact with said carriage at the end of rails outstrokes to augment outstroke deaccelerations of the rails.

21. The apparatus of claim 20 wherein said carriage is movably mounted to said frame by means of at least one flexible carriage hinge that has an end rigidly secured to said frame.

22. The apparatus of claim 21 wherein said bumper is mounted to said frame for contact with said carriage hinge.

23. Apparatus for conveying shrimp comprising a frame and a carriage movably supported upon said frame, a pair of rails rigidly mounted on said carriage together side by side spaced apart a distance to support shrimp generally upright therebetween, and means for reciprocally moving said pair of rails with changes in velocity sufficient to create shrimp momentum for them to slidably advance including a bumper mounted to said frame for contact with said carriage to create a change in the velocity of said rails.

24. Apparatus for sorting shrimp according to size which comprises a pair of rails mounted side by side a distance apart sufficient to support shrimp of diverse sizes uprightly in single file formation along an upstream portion thereof; and means for reciprocating said pair of rails such that deacceleration is greatened at the end of outstroke rail movements than at the end of backstroke rail movements, said reciprocating means including a bumper mounted to said frame for contact with said carriage as it is reciprocally moved to cause changes in the velocity of said rails, whereby the shrimp momentum generated by the reciprocating rails may cause them to be conveyed on the rails from their upstream portions towards their downstream portion and thereby be sorted according to size.

25. Apparatus for deheading shrimp comprising a pair of rails rigidly mounted together side by side spaced apart a distance to support shrimp generally uprightly in single file formation in an elongated gap therebetween; means for moving said pair of rails so as to cause shrimp to advance thereon; a pinch block mounted between said rails at a deheading station; a shrimp head collection trough mounted adjacent said pinchblock, a pinch finger mounted for movement between said rails along a path of travel passing closely adjacent to said pinch block; said pinch finger having a finger tip to which a resilient head flipper is mounted for flipping severed heads over said pinch block and into said collection trough, and means for moving said pinch finger along said path of travel.

26. Apparatus for deheading shrimp comprising a pair of rails rigidly mounted together side by side spaced apart a distance to support shrimp generally uprightly in single file formation in an elongated gap therebetween; means for moving said pair of rails so as to cause shrimp to advance thereon; a pinch block mounted between said rails at a deheading station; a pinch finger mounted for intermittent movement along an orbital path of travel between said rails along a path of travel passing closely adjacent to said pinch block; and means for moving said pinch finger along said path of travel.

27. The apparatus of claim 26 further comprising detection means for detecting individual shrimp having advanced on said rails to a selected position in proximity with said pinch block, and means responsive to detection of shrimp by said detecting means for actuating said pinch finger moving means.

* * * * *